J. L. CHESNUTT.
PNEUMATIC EQUALIZER FOR VEHICLES.
APPLICATION FILED JUNE 23, 1916.

1,244,700.

Patented Oct. 30, 1917.
2 SHEETS—SHEET 1.

INVENTOR:
J. L. CHESNUTT
By Earl M. Sinclair
Atty.

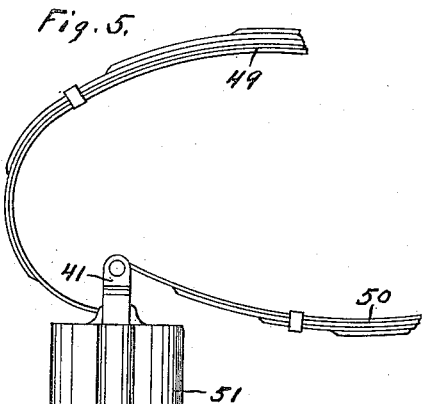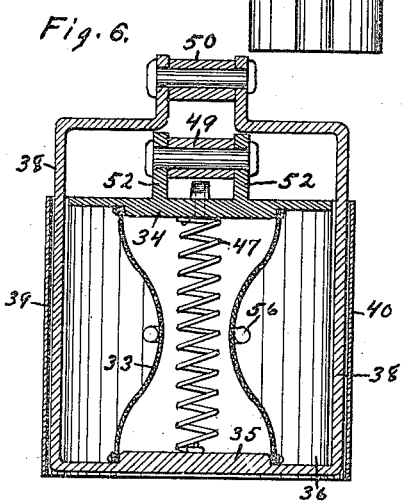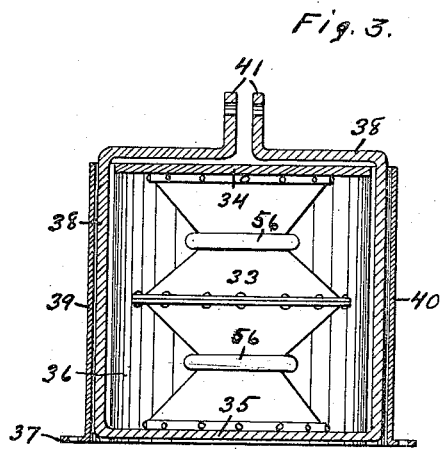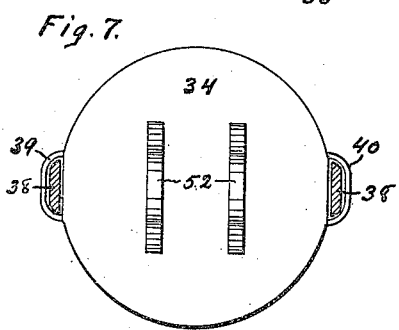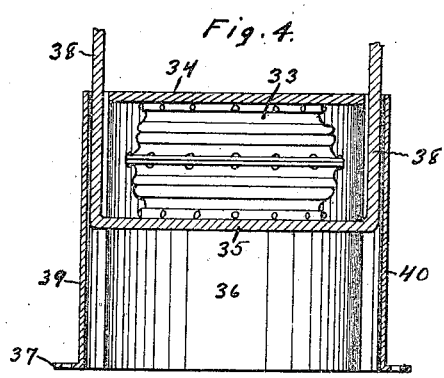

UNITED STATES PATENT OFFICE.

JOHN LOUCIEN CHESNUTT, OF KANSAS CITY, MISSOURI.

PNEUMATIC EQUALIZER FOR VEHICLES.

1,244,700. Specification of Letters Patent. Patented Oct. 30, 1917.

Application filed June 23, 1916. Serial No. 105,377.

*To all whom it may concern:*

Be it known that I, JOHN L. CHESNUTT, citizen of the United States of America, and resident of Kansas City, Jackson county, Missouri, have invented a new and useful Pneumatic Equalizer for Vehicles, of which the following is a specification.

The object of this invention is to provide improved pneumatic means for equalizing the shock between corners of a vehicle.

A further object of this invention is to provide improved pneumatic means for equalizing the shock between front and rear corners of a vehicle.

A further object of this invention is to provide improved pneumatic means for equalizing the shock between all corners of a four-wheeled vehicle.

A further object of this invention is to provide improved pneumatic means for equalizing the rebound between corners of a vehicle.

A further object of this invention is to provide improved pneumatic means for distributing the shock and rebound between the several corners of a vehicle.

A further object of this invention is to provide improved means for absorbing and dissipating the shock not distributed or transmitted.

A further object of this invention is to provide improved means for increasing the life and usefulness of a vehicle and the various parts thereof by distributing, equalizing, absorbing and reducing the strain of load and road on any given portion or member at all times and under all conditions.

A further object of this invention is to provide improved means for distributing and decreasing the effect of shock and rebound on the vital parts and members of a vehicle, such as the body springs, axles, motive plant, wheels, and the like, and thereby increasing the life and usefulness of such members.

A further object of this invention is to provide an improved construction for an air-bag or cushioning device for use in a pneumatic equalizer.

My invention consists in the construction, arrangement and combination of elements hereinafter set forth, pointed out in my claims and illustrated by the accompanying drawing, in which—

Figure 1:
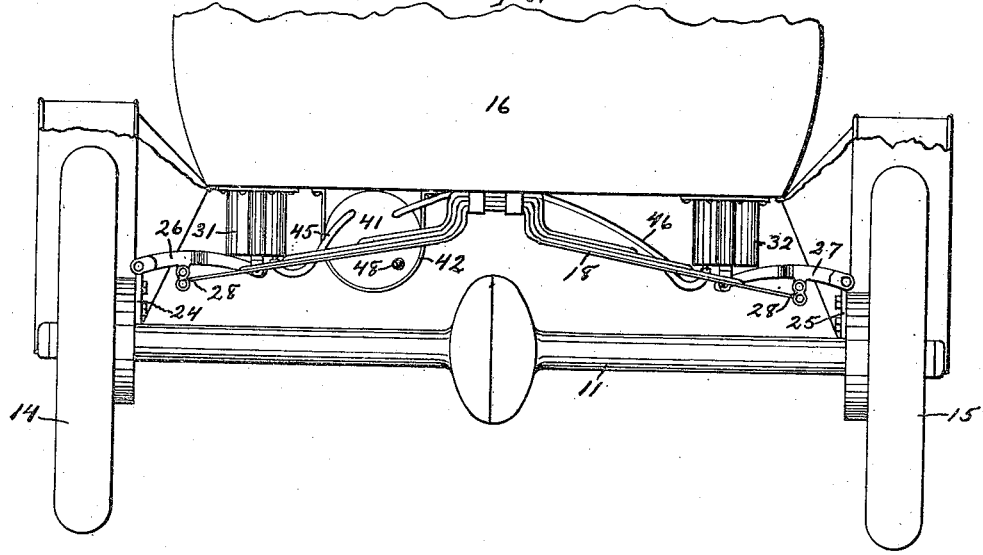
Figure 2:
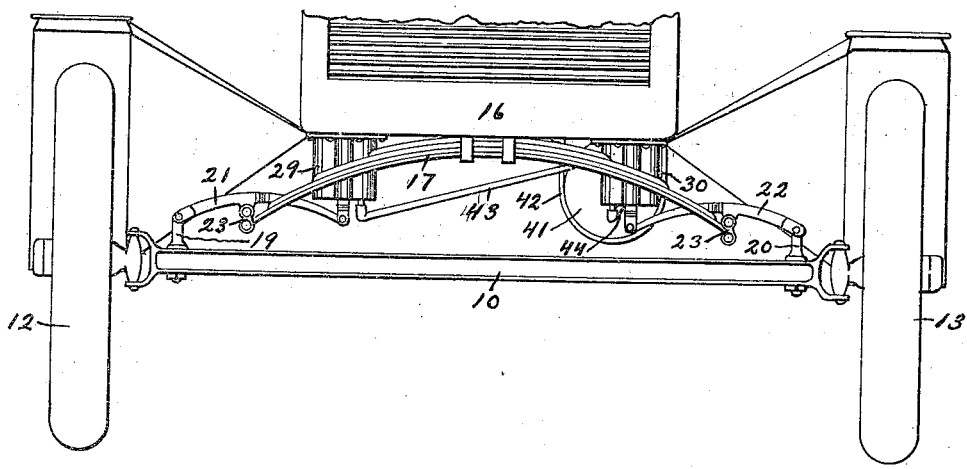

Figure 1 is a rear elevation illustrating one method of equipping a vehicle with my improved pneumatic equalizing device. Fig. 2 is a front elevation of the same. Fig. 3 is a vertical section, on an enlarged scale, showing one of the air-bags detached, in expanded condition. Fig. 4 is a similar view showing the air-bag in compressed condition.

Fig. 5 is a side elevation showing an adaptation of the device to a different type of vehicle. Fig. 6 is a vertical section, on an enlarged scale, of the air-bag employed in the construction according to Fig. 5, in expanded condition. Fig. 7 is a plan of the same.

In the construction of the mechanism as shown, especially in Figs. 1 to 4 inclusive, the numeral 10 designates the front axle and 11 the rear axle of a vehicle of any suitable construction, said axles being carried respectively by front supporting and steering wheels 12, 13 and rear supporting and traction wheels 14, 15, and carrying a suitable body 16 on a front spring 17 and rear spring 18, in this instance transversely arranged. The vehicle is here shown as an automobile, but it is to be understood that my improvements may be applied to other types of vehicles.

Brackets 19, 20 are fixed to and rise from opposite end portions of the front axle 10, and levers 21, 22 are fulcrumed at one end each on said brackets and extend inwardly therefrom normally in approximately a horizontal plane. The levers 21, 22 are bent, curved or offset rearwardly out of the vertical plane of the axle 10. The levers 21, 22 are provided, intermediate of their ends, with means for pivotally connecting upper ends of shackles 23, from which are supported end portions of the body spring 17.

Brackets 24, 25 are fixed to and rise from end portions of the rear axle 11, and levers 26, 27 are fulcrumed at their ends on said brackets and extend inwardly therefrom normally in approximately horizontal planes. The levers 26, 27 are bent, curved or offset forwardly out of the vertical plane of the axle 11. The levers 26, 27 are provided, intermediate of their ends, with means for pivotally connecting upper ends of shackles 28, from which are supported end portions of the body spring 18.

Pneumatic cushioning devices 29, 30, 31, 32 are provided, and are adapted to yieldingly support the inner ends of the levers 21, 22, 26, 27 respectively. In this instance the cushioning devices are shown as pivotally fixed to and depending from opposite corners of the vehicle body 16, the ends of the levers being pivoted and suspended from said cushioning devices; but said devices may be supported on the axles 10, 11 if desired, and support and carry the ends of the levers, with the same effect.

In detail, I prefer to construct the cushioning devices substantially as follows: An air bag 33 is formed of suitable flexible or semi-flexible material such as fabric, leather or the like, and is secured at its ends to plates 34, 35 of metal. The bag 33 and its joints with the end plates 34, 35 preferably are coated with a suitable mixture to render the device air-tight. Between the end plates 34, 35 the air-bag 33 is encircled by one or more rings or bands 56, thereby giving to said bag, in a general way, a bellows or accordion shape, to permit forcible compression thereof, when inflated, without bursting or damaging the bag. One of the end plates is provided with pivotal means for supporting from the body 16 or one of the axles, while the other of said end plates is provided with means for pivotally connecting an end of a lever such as 21, 22, 26 or 27, and as it is desirable to provide a casing or protection for the bag, I have deemed it advisable to combine such casing with certain of the above-mentioned connecting means. In this instance I have shown the plate 34 extended materially beyond the margins of the bag 33 and a cylindrical casing 36 formed thereon and inclosing said bag and extending to or beyond the opposite end plate 35. The casing 36 is in this instance formed with a peripheral flange 37 at the end adjacent the plate 35, and said flange is apertured and adapted to be secured to the body 16, or other suitable support. The end plate 35 is continued to form a yoke 38 traversing the casing 36 and having its legs slidably mounted in diametrically opposite slide bearings 39, 40 formed in said casing. The legs of the yoke 38 are turned inwardly and cross the plate 34, and are then turned at right angles to form spaced, outstanding lugs 41, which are apertured and receive pivotal connection of the end portions of the levers 21, 22, 26, 27. Thus provision is made for compression of the air-bags 33 between their end plates 34, 35, the yokes 38 sliding in their bearings in the casings 36, and permitting oscillation of the levers 21, 22, 26, 27 under strain communicated from either supporting wheel, or from the body 16. This arrangement provides an effective cushioning between the wheels and body of the vehicle.

A reserve air compartment or receptacle 41 is provided, and is supported in any suitable manner on the vehicle, as by bands 42 connected to the under side of the body 16. The reserve air receptacle 41 is connected by conductors, preferably formed of flexible hose, and indicated by the numerals 43, 44, 45, 46, to the several air cushion devices 29, 30, 31, 32. Thus all of the cushioning devices are connected through the central reservoir, and any shock or strain communicated to either of them is equalized, distributed, dissipated and transmitted throughout and to all of the cushioning devices, and is in part absorbed by the cushioning devices and central reservoir, by air compression. Thus all of the corners of the vehicle are yieldingly supported by the levers, connected to the air cushioning devices, which are in turn connected, so that any jar, jolt, shock or rebound communicated to either corner of the body by the supporting wheel adjacent thereto, will be transmitted and distributed equally to all other corners, through an oscillation of said levers, compression or expansion of said cushioning devices, and travel of air through the conductors 43, 44, 45, 46 and reservoir 41. The accompanying strain is equally distributed and is also reduced and minimized at the corner which would naturally receive the greatest strain and shock. In addition the shock, strain and reactional rebound are diminished, reduced and absorbed in part by the action of the pneumatic devices, and the jerky motion of the body due to travel over rough roads is transformed into a wavy or undulating motion. The life of the vehicle, and of the vital parts thereof, is thus prolonged by taking away the severe shock and strain to which they would otherwise be subjected.

A coil spring 47 (shown in Fig. 6) is mounted between the end plates 34, 35 of the cushioning devices, and tends to return each such device to normal position, by separating said plates, after each compression of the air-bags 33, and by approximating said plates after each expansion of the bags.

A valve-controlled connection 48 is provided for the reservoir 41, by means of which said reservoir and the air-bags 33 may be inflated by the use of an air-compressing pump.

In Figs. 5, 6 and 7 I have illustrated an adaptation of the pneumatic devices to a vehicle equipped with the side springs arranged longitudinally at each corner. Such springs consist of an upper member 49 and a lower member 50, usually pivotally connected at one end; the lower member being supported on an axle of the vehicle, and the upper member being connected to and supporting a portion of the vehicle body. I have substituted for the usual pivotal connection between the spring members 49, 50 one of my pneumatic cushioning devices, indicated generally by the numeral 51, and constructed in a manner similar to that previously described. The yoke 38 is pivoted to the lower spring member 50, and the end plate 34 is formed with upwardly projecting lugs 52, to which is pivoted the end of the upper spring member 49. Thus a pneumatic cushioning device is provided between the spring members to supplement the action of the spring, and to absorb and reduce a portion of the shock, jar and rebound as above described. The cushioning devices are provided at the four corners of the vehicle, and are connected to a central reservoir in a manner similar to that described in connection with Figs. 1 to 4 inclusive.

It is to be understood that other constructions and arrangement of parts may be employed to adapt the pneumatic cushioning devices to other types of vehicles, and I do not desire to be understood as limiting myself to the precise construction and arrangement herein shown and described.

It is to be understood also that the air bags 33 are capable of either expansion or compression from their normal conditions, to permit passage of air in either direction to or from either bag with reference to the others and the reservoir 41, according to whether the adjacent road wheel is at the time running over an obstruction or dropping into a depression.

The coil springs 47 of the air bags are relatively light and not designed to support any of the load nor absorb any of the shock, but tend only to return the devices to normal positions after movement in either direction therefrom, by retraction or expansion.

I claim as my invention—

1. In combination with a vehicle body, supporting springs therefor and a vehicle supporting frame, pneumatic cushioning devices mounted between said supporting frame and the body and having suspending connections to said supporting springs, said pneumatic devices being adapted normally for either expansion or contraction, an air reservoir, and connections between said reservoir and each of said cushioning devices.

2. A device of the class described, comprising a supporting device, a device to be carried thereby, springs interposed between said devices, pneumatic cushioning members secured to one of said devices, levers fixed to the other of said devices and pivotally connected to said pneumatic cushioning members, an air reservoir, connections between said air reservoir and each of said pneumatic cushioning members, yielding devices tending to maintain said pneumatic cushioning members normally at intermediate positions between complete expansion and compression, and pivotal connections between the springs and intermediate portions of said levers.

3. A device of the class described, comprising a supporting device, a body device to be carried thereby, body springs interposed between said devices, pneumatic cushioning devices secured to one of said devices, levers pivoted at their ends to the other of said devices, and pivotally connected at one end each to one of said pneumatic cushioning devices, an air reservoir, connections between said air reservoir and each of said pneumatic cushioning members, said pneumatic cushioning devices being adapted normally for either expansion or compression, yielding pressure devices tending to maintain said pneumatic cushioning devices at their intermediate positions, and pivotal connections between intermediate portions of said levers and end portions of said body springs.

4. A device of the class described, comprising a support, a device to be carried thereby, levers fulcrumed on said support and provided with connecting means for said device, pneumatic cushioning devices suitably mounted between said support and device, each of said pneumatic devices including an equilibrating spring tending to maintain said pneumatic device at an intermediate position, and pivotal connections between said levers and cushioning devices.

5. A device of the class described, comprising a support, a device to be carried thereby, levers fulcrumed on said support and provided with connecting means for supporting said device, pneumatic cushioning devices mounted between said support and device and connected to said levers, said pneumatic devices being adapted normally for either expansion or compression, equilibrating springs being provided for each of said pneumatic devices tending to maintain said pneumatic devices at their normal positions, an air reservoir, and connections between said reservoir and cushioning devices.

6. A device of the class described, comprising a support, a device to be carried thereby, body springs interposed between said support and device, pneumatic cushioning devices secured to the under side of said device, levers pivoted at their outer ends to said support, pivotal connections between end portions of said springs and intermediate portions of said levers, each of said levers being pivotally connected at its inner end to the lower side of one of said pneumatic cushioning devices, an air reservoir, connections between said air reservoir and each of said pneumatic cushioning devices, said pneumatic cushioning devices being adapted normally for either expansion or compression, and yielding pressure devices tending to maintain said pneumatic cushioning devices at their intermediate positions.

7. A device of the class described, comprising a support, a device to be carried thereby, forward and rear body springs interposed between said support and device, pneumatic cushioning devices spaced transversely and longitudinally and secured to said device, levers pivoted at their outer ends on said support adjacent said pneumatic devices, each of said levers being connected at its inner end to one of said pneumatic devices, an air reservoir, connections between said reservoir and each of said pneumatic devices, yielding pressure devices acting to maintain said pneumatic devices normally at intermediate positions between complete expansion and compression, said levers being offset intermediate of their ends, and links pivoted to intermediate portions of said levers and pivotally connected to and supporting end portions of the body springs.

8. A device of the class described, comprising a support, a device to be carried thereby, levers fulcrumed on said support, pivotal connections between said levers and the device, spaced air bags attached to said device, members fixed to and movable axially of said air bags, an equilibrating spring being provided for each air bag to maintain it normally at an intermediate position, and pivotal connections between each of said levers and an adjacent air bag member.

9. A device of the class described, comprising a vehicle supporting frame, a vehicle body mounted on body springs, levers fulcrumed on said supporting frame, means for pivotally connecting said body springs to said levers, spaced air bags attached to said body, members fixed to and movable axially of said air bags, pivotal connections between said levers and said members, an equilibrating spring being provided for each air bag tending to maintain it at an intermediate position for either expansion or compression, an air reservoir, and connections between said reservoir and each of said air bags.

10. A device of the class described, comprising a support, a device to be carried thereby, an air bag interposed between said support and device, plates fixed to opposite ends of said air bags, connections between said plates and the support and device respectively, and an equilibrating spring interposed between said plates and tending to maintain said air bag at an intermediate position between complete expansion and compression.

11. A device of the class described, comprising a support, a device to be carried thereby, an air bag interposed between said support and device and normally tending to maintain an intermediate position between complete expansion and compression, a casing surrounding said air bag, a plate slidably mounted in said casing and engaging one end of said air bag, a lever fulcrumed on said support, pivotal connections between said lever and plate, and pivotal connections between said lever and the device.

12. The combination, with a vehicle having axles, supporting wheels thereon, and a body to be carried by said axles, of levers fulcrumed on end portions of said axles, equilibrating pneumatic devices interposed between said axles and body composed of spaced plates, air bags therebetween, and springs between said plates and normally holding them in intermediate spaced relations between their extremes of movement, said pneumatic devices being constantly connected for coöperative action by intercommunication between the air bags, and pivotal connections between said levers and pneumatic devices.

13. The combination, with a vehicle having axles, supporting wheels thereon, and a body to be carried by said axles, of levers fulcrumed on said axles, equilibrating pneumatic devices interposed between said axles and body composed of spaced plates, air bags therebetween, and springs between said plates and normally holding them in such position that said air bags are capable of either expansion or compression, pivotal connections between said levers and pneumatic devices, an air reservoir, and connections between said reservoir and each of said pneumatic devices.

14. In a pneumatic device, an air bag, a plate secured to each end thereof, a casing formed on one of said plates and inclosing said air bag, a yoke formed on the opposite plate and extending slidingly through said casing, and connecting means on said yoke and casing.

15. In a pneumatic device, an air bag, a plate secured to each end thereof, securing means formed on said plates, and a light spring mounted between said plates and adapted normally to hold them in intermediate spaced relations, permitting expansion or contraction of said air bag.

16. In a pneumatic device, an air bag, a plate secured to each end thereof, a casing formed on one of said plates and inclosing said air bag, a yoke formed on the opposite plate and extending slidingly through said casing, an equilibrating spring mounted between and fixed to said plates, whereby said air bag normally is maintained at an intermediate position between expansion and contraction, and connecting means on said yoke and casing.

17. The combination, with a vehicle having axles, supporting wheels thereon, and a spring-supported body to be carried by said axles, of levers fulcrumed on end portions of said axles, equilibrating pneumatic devices interposed between said axles and body, a common reservoir to which said pneumatic devices are connected, whereby coadjutive action is obtainable, said pneumatic devices being independent of the body springs, and pivotal connections between said levers and pneumatic devices.

18. The combination, with a vehicle having axles, supporting wheels thereon, and a spring-supported body to be carried by said axles, of levers fulcrumed on said axles, pivotal connections between said levers and the body springs, pneumatic devices interposed between said axles and the body, pivotal connections between said levers and pneumatic devices, said pneumatic devices having no connection to the body springs except through said levers, an air reservoir, and connections between said reservoir and each of said pneumatic devices.

Signed by me at Kansas City, Missouri, this fifteenth day of June, 1916.

JOHN LOUCIEN CHESNUTT.

Witnesses:
JOHN R. GARRISON,
A. J. ALBERG.

Copies of this patent may be obtained for five cents each, by addressing the "Commissioner of Patents, Washington, D. C."